US006292738B1

United States Patent
Feldkamp et al.

(10) Patent No.: US 6,292,738 B1
(45) Date of Patent: Sep. 18, 2001

(54) METHOD FOR ADAPTIVE DETECTION OF ENGINE MISFIRE

(75) Inventors: Timothy Mark Feldkamp, Ann Harbor; Danll Valentinovich Prokhorov, Dearborn; Kenneth Andrew Marko, Ann Arbor; Lee Albert Feldkamp, Plymouth, all of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/488,221

(22) Filed: Jan. 19, 2000

(51) Int. Cl.[7] .................................................. G01M 15/00
(52) U.S. Cl. ........................................... 701/106; 701/111
(58) Field of Search ................................. 701/102, 103, 701/106, 110, 111, 114, 115

(56) References Cited

U.S. PATENT DOCUMENTS

| | | |
|---|---|---|
| 5,495,415 | 2/1996 | Ribbens et al. . |
| 5,531,108 | 7/1996 | Feldkamp et al. . |
| 5,561,600 * | 10/1996 | McCombie ............................ 701/111 |
| 5,576,963 * | 11/1996 | Ribbens et al. ....................... 701/111 |
| 5,699,252 * | 12/1997 | Citron et al. .......................... 701/111 |
| 5,699,253 | 12/1997 | Puskorius et al. . |
| 5,732,382 | 3/1998 | Puskorius et al. . |
| 5,774,823 | 6/1998 | James et al. . |
| 5,794,171 | 8/1998 | Bryant et al. . |
| 5,862,505 * | 1/1999 | Fujiki et al. .......................... 701/111 |
| 5,862,507 * | 1/1999 | Wu et al. .............................. 701/111 |

* cited by examiner

*Primary Examiner*—Willis R. Wolfe
(74) *Attorney, Agent, or Firm*—Ford Global Tech, Inc.

(57) ABSTRACT

An engine misfire detection system (10) for detecting engine misfire. System (10) includes a conventional controller (12) having a memory unit (14) and a plurality of sensors (16). Controller (12) includes a plurality of neural networks, which are trained by system (10), and which determine whether a firing event is a misfire based upon events occurring before the firing event and events occurring after the firing event. The neural networks are adaptively trained to compensate for the effects of engine variability and aging.

17 Claims, 6 Drawing Sheets

METHOD FOR ADAPTIVE DETECTION OF ENGINE MISFIRE

FIELD OF THE INVENTION

This invention relates to a method for adaptive detection of engine misfire and more particularly, to a method which accurately detects misfires within an internal combustion engine by the use of multiple neural networks which are automatically and adaptively trained to compensate for the effects of vehicle variability and aging.

BACKGROUND OF THE INVENTION

Engine misfire detection systems are employed within internal combustion engines in order to reduce the likelihood of harmful emissions being discharged by the engine. Conventional engine misfire detection systems, assemblies, and methodologies typically receive and/or measure the angular velocity of the engine's crankshaft to derive angular acceleration values that are used to determine the occurrence of misfires within the cylinders of the engine. Particularly, engine misfire detection systems analyze the derived acceleration values to determine whether any "acceleration deficits" (i.e., less than normal or desirable acceleration values) are present, and compare these "acceleration deficit" values to predetermined deficit values, which are expected in the event of a misfire, to determine if a misfire has occurred. The predetermined deficit values typically vary based upon the specific cylinder that is firing, and upon the operating condition of the vehicle's engine (e.g., the engine speed and load).

For example and without limitation, because the crankshaft is not "perfectly stiff", it gives rise to torsional oscillations, which are manifested as additions or subtractions to/from the acceleration of the crankshaft. These torsional oscillations vary based upon the cylinder that is firing and the operating conditions of the engine. Under certain operating conditions, accelerations resulting from these torsional oscillations may exceed or equal the acceleration deficits caused by a misfire, thereby significantly and adversely effecting the accuracy of misfire detection.

Various attempts have been made to compensate for the effects of torsional oscillations. For example and without limitation, engine misfire detection systems and methods have used adaptive schemes and static neural networks to compensate for the effects of torsional oscillations, such as the systems described within U.S. Pat. No. 5,531,108 of Feldkamp et al., and U.S. Pat. No. 5,774,823 of James et al., which are each assigned to the assignee of the present invention and which are each fully and completely incorporated herein by reference.

Other prior engine misfire detection systems have implemented dynamic neural networks to compensate for the effects of torsional oscillations. In one type of misfire detection system, described in U.S. Pat. No. 5,699,253 of Puskorius et al., which is assigned to the present assignee, and which is fully and completely incorporated herein by reference, a dynamic or "recurrent" neural network is trained to convert observed acceleration values to values which are nearly representative of values sensed by an ideal sensor operating in the absence of torsional oscillations. In this type of system, the neural network acts as a "nonlinear filter" or as an "inverse model".

In another type of misfire detection system, described in U.S. Pat. No. 5,732,382 of Puskorius et al., which is assigned to the present assignee and which is fully and completely incorporated herein by reference, a dynamic or "recurrent" neural network is trained to "detect" or to directly determine whether a misfire has occurred. In this type of system, the neural network effectively and operatively combines the functions of an inverse model and a classifier. While these neural network-type systems have been proven to be more effective in compensating for the effects of torsional oscillations than other prior methods and/or systems, they suffer from several drawbacks.

For example and without limitation, because these prior neural network type systems are typically "trained" as part of a development process, they have a limited ability to handle variations that arise from vehicle-to-vehicle variability and the effects of vehicle aging. Particularly, because the "training" process is relatively complicated, time consuming and computationally intensive, it is not suited to be carried out "on-line" or during the normal use of a vehicle or an engine.

Additionally, known or predetermined output target values, which are required to train the neural networks, are typically not available during the normal use of the vehicle. During the development of the neural networks, output target values are made to be available and/or are artificially and precisely "synthesized" by the use of, for example and without limitation, ideal laboratory grade sensors and equipment, complex filtering techniques, and artificially induced engine misfires. During the normal operation of an engine or vehicle, these types of artificially "synthesized" target output values are not available. Hence, these systems cannot be adaptively trained "on-line".

Another drawback associated with these prior systems is that they do not take into account the effect that misfires have on future firing events. By failing to consider the accelerations and torsional oscillations that are generated by a misfire, classifications or determinations of firing events, which occur after a misfire, may be incorrect or inaccurate.

Applicant's invention addresses these drawbacks and provides a method for detecting misfire within an engine which automatically adapts to the effects of vehicle variability and aging, and which takes into account the effect that misfires have on future firing events.

SUMMARY OF THE INVENTION

It is a first object of the invention to provide a method for detecting misfire within an engine which overcomes at least some of the previously delineated drawbacks of the prior systems, devices, and/or methods.

It is a second object of the invention to provide a method and for detecting misfire within an engine which utilizes a plurality of neural networks to determine whether a misfire within an engine has occurred.

It is a third object of the invention to provide a method for detecting misfire within a vehicle engine which utilizes a plurality of trainable neural networks to adaptively compensate for the effects of vehicle variability and aging.

It is a fourth object of the invention to provide a method for detecting misfire within an engine which takes into account the effects that misfires have on future firing events.

According to one aspect of the present invention a system for determining whether a first firing event within an engine is a normal event or a misfire is provided. The system includes at least one sensor which measures first engine operating data which is associated with the first firing event, and second engine operating data which is associated with at least one second firing event which occurs before the first firing event. The system further includes a controller which is communicatively coupled to the at least one sensor and which receives the first and the second engine operating data. The controller is effective to determine whether the first firing event is a misfire or a normal event based upon the first engine operating data and the second engine operating data.

According to a second aspect of the present invention, a method for determining if a firing event within an engine is a misfire is provided. The method includes the steps of: identifying a plurality of potential misfire states for the engine; providing a plurality of neural networks, each of the neural networks corresponding to a unique one of the potential misfire states; determining a first probability that each of the plurality of neural networks corresponds to a current misfire state of said engine; determining a second probability that each of the plurality of neural networks corresponds to a misfire state of the engine which occurs before the event; determining a third probability that each of the potential neural networks corresponds to a misfire state of the engine which occurs after the event; and adaptively training the plurality of neural networks based upon the first, the second, and the third probabilities.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
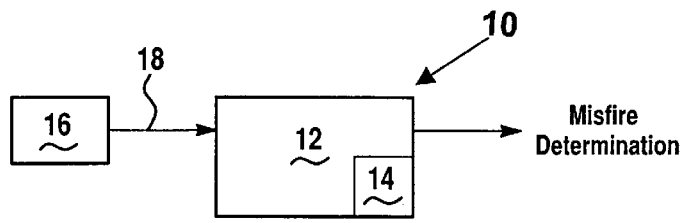
FIG. 1 is a block diagram of a system for detecting misfire within an engine incorporating the teachings of the preferred embodiment of the invention.

Referring now to FIG. 1, there is shown a block diagram of an engine misfire detection system or apparatus 10 which is made in accordance with the teachings of the preferred embodiment of the invention. As shown, system 10 includes a conventional microprocessor, microcontroller or controller 12 having a memory unit 14 and operating under stored program control. Controller 12 is electrically, physically, and communicatively coupled to conventional engine operating condition sensors 16 by use of one or more communications buses or paths 18. As described more fully and completely below, controller 12 receives signals generated by sensors 16, and processes and utilizes the received signals to determine whether a misfire has occurred within the engine.

In the preferred embodiment, controller 12 includes one or more microprocessors and a plurality of neural networks which cooperatively perform the below-described calculations, algorithms, and/or processes. In the preferred embodiment of the invention, memory 14 is a conventional memory unit including both permanent and temporary memory, and is adapted to and does store at least a portion of the operating software which directs the operation of controller 12. Moreover, memory 14 is adapted to selectively store other types of data or information, including information associated with the operation of the preferred embodiment of the invention and/or associated historical data, processing data, and/or operational data. As will be more fully discussed below, examples of such data include, but are not limited to, data defining current and past engine operating conditions and events, misfire states, accelerations, engine loads, engine speeds, and cylinder identification data, which are used by controller 12 to determine whether an engine misfire has occurred. As should also be apparent to those of ordinary skill in the art, controller 12 and memory 14 may actually comprise a plurality of commercially available, conventional, and disparate chips or devices, which are operatively and communicatively linked in a cooperative manner.

Sensors 16 comprise a plurality of conventional and commercially available sensors which measure and/or acquire information pertaining to the engine (e.g., engine operating data). In the preferred embodiment of the invention, sensors 16 include one or more conventional cylinder identification sensors, one or more engine speed or velocity sensors and one or more engine load sensors. Examples of such sensors are described within U.S. Pat. No. 5,791,171 of Bryant et al., which is assigned to the present assignee, and which is fully and completely incorporated herein by reference. Sensors 16 provide engine operating data, such as engine speed, load, acceleration, and cylinder identification values to controller 12, which utilizes these values, as discussed more fully and completely below, to adaptively train the neural networks of system 10, and to accurately detect the presence of misfires within the engine. It should be appreciated that sensors 16 may include conventional filtering and/or processing devices or circuits (e.g., low pass, high pass, and/or band pass filters) which filter and/or process the measured or sensed data prior to sending the data to controller 12.

System 10 utilizes a plurality of trainable static neural networks to detect the presence or absence of a misfire within an engine. These neural networks may be stored within controller 12 and memory 14, and/or may comprise one or more disparate chips or devices which are operatively linked to controller 12 and memory 14. The neural networks are used by system 10 to model the relationship between the engine's speed and load for a certain firing event and the resulting or "expected" acceleration for that firing event. The modeling is performed separately for each cylinder and for each "misfire state" or sequence (i.e., the presence or absence of misfire in a sequence of firing events). It should be appreciated that the "expected" acceleration of the crankshaft at a current event will vary based on the lingering effects of prior misfires (e.g., acceleration deficits). It should further be appreciated that the "expected" acceleration of the crankshaft will also vary depending on the specific cylinder that is fired. Thus, as described more fully and completely below, the present system 10 more accurately detects misfire events by modeling the neural networks in a manner that considers the unique attributes or responses of the various cylinders within the engine and the effects of prior engine misfires.

Figure 2:
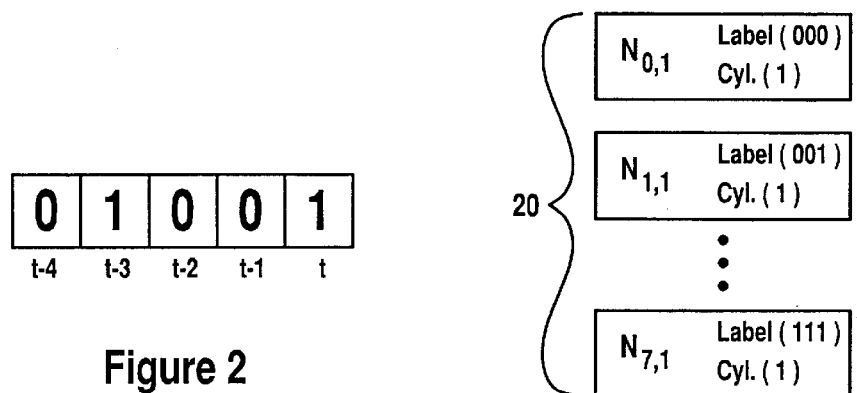
FIG. 2 is an example of a five-bit notation of a misfire sequence.

The neural networks of system 10 are arranged in several groups or sets, each group or set corresponding to a unique cylinder within the engine. Each of the networks that are contained within a group or set has a "label", which corresponds to a misfire state or sequence. A misfire state or sequence is defined by the presence or absence of misfire (respectively denoted by a binary value of 1 or 0) for a predetermined number of past firing events (e.g., the last "m" cylinder events) ending with the current cylinder event. Hence, if the predetermined number ("m") were equal to five, then a five-bit notation would represent the current event and four events sequentially prior to the current event. Referring now to FIG. 2, for example and without limitation, a five-bit notation of "01001" would denote a sequence in which a misfire is present at the current firing event or "t" and at three firing events prior to the current event or "t-3". Correspondingly, no misfire was present at the event prior to the current event or "t-1", at two events prior to the current event or "t-2", and at four events prior to the current event or "t-4". A group or set of neural networks is provided for each cylinder of the engine, and each group or set includes neural networks corresponding to each possible misfire state. Hence, the number of networks employed for a "$N_{cyl}$"-cylinder engine may be as many as $N_{cyl} * 2^m$. In one alternate embodiment, the number of networks is reduced by eliminating certain networks that correspond to highly "unlikely" misfire states, such as 11111.

Figure 3:
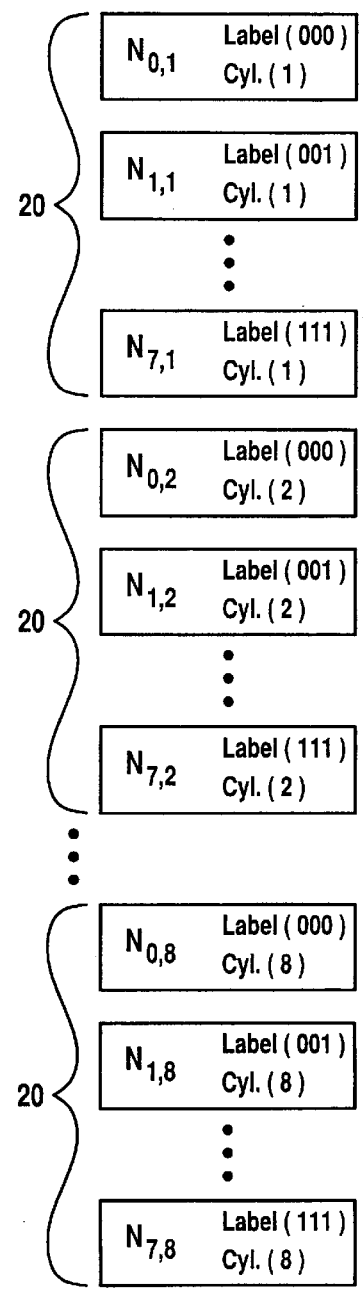
FIG. 3 is a block diagram illustrating a plurality of neural networks, which are employed by the system that is shown in FIG. 1.

Referring now to FIG. 3, in the preferred embodiment of the invention, the system 10 is deployed on a conventional eight-cylinder engine, and includes a plurality of networks (i.e., $N_{0,1}$ through $N_{7,8}$). In this non-limiting embodiment, the misfire states are defined by three firing events (i.e., the current event and two events prior to the current event). Each group or set 20 of networks corresponds to a specific cylinder (i.e., cylinder 1 through 8), and includes networks which represent each of the possible misfire states (i.e., 000, 001, 010, 011, 100, 101, 110, and 111) for the engine. Each of the networks (i.e., $N_{0,1}$ through $N_{7,8}$) includes a "label" representing the corresponding possible misfire state of the engine (i.e., 000 through 111 in a decimal format or "0" through "7"), which is shown as the leftmost subscript, and a cylinder notation (i.e., "1" through "8"), which is shown as the rightmost subscript.

Figure 4:
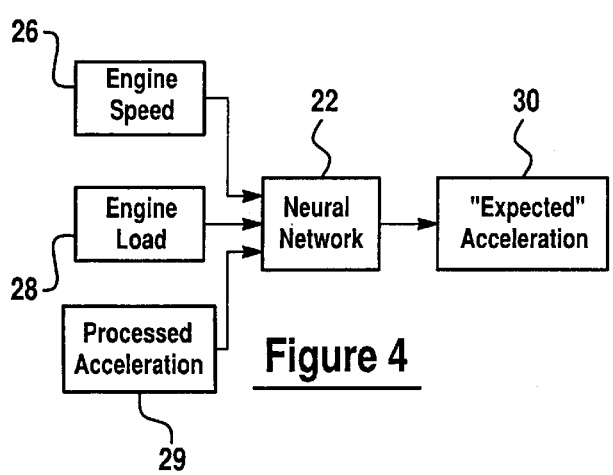
FIG. 4 is a block diagram illustrating the broad functionality of the neural networks shown in FIG. 3.

Referring now to FIG. 4, each network 22 receives an engine speed value 26, an engine load value 28, and a processed or filtered acceleration value 29, and outputs an "expected" acceleration value 30, based upon values 26, 28 and 29. Values 26 and 28 respectively represent the measured or sensed engine speed and engine load at a certain time or engine firing event. Values 26 and 28 are measured by sensors 16, and are communicated to each of the networks 22 by use of controller 12. The "expected" acceleration value 30, which is output by each neural network 22, represents the value of the crankshaft acceleration that would be expected if that neural network 22 (e.g., $N_{0,1}$) is the network which correctly describes the current engine misfire state. In other alternate embodiments, the networks may be trained to receive only a unique one or two of values 26, 28 and 29, and to output an "expected" acceleration value based only upon that received value(s). It should be appreciated that the neural networks of the present invention could also be adapted to receive other types of engine operating data and to output other types of "expected" values in order to determine or detect other types of engine operating states and/or conditions.

In the preferred embodiment of the invention, the networks are first developed or "pre-trained" by use of "labeled data" (i.e., data where the presence or absence of misfire is known for each event). The labeled data is typically supplied "off-line" and/or under experimental or laboratory conditions. This type of training is well known in the art and has been described in, for example and without limitation, in U.S. Pat. No. 5,774,823 of James et al., which is incorporated by reference. During this "off-line" training, each network (e.g., $N_{0,1}$–$N_{7,8}$) receives "training" or development when its "label" is consistent with the current cylinder and the current engine misfire state, which are known for each event. In other alternate embodiments, other "off-line" training methods may be employed, such as multi-stream training. Once the neural networks have been "pre-trained" they may be implemented within system 10, and will slowly adapt to the individual engine and/or vehicle within which system 10 is deployed.

Because labeled data is typically not available when an engine or vehicle is in normal use, the correct engine misfire state is not known for each event, and hence the correct network to train is also not known. In order to train the correct networks, a "bootstrapping" procedure is used in which the networks that correspond to a current cylinder "compete" with each other to be trained. In the preferred embodiment, each network within a group or set receives training at each firing event. The learning rate for each network, however, is based on the probability that the network is the correct network for describing the speed-load-acceleration observations for a certain misfire state. Particularly, networks that have a higher probability of being the "correct" network receive a higher degree of training than other networks. In the preferred embodiment of the invention, the event for which networks are trained or adapted, and for which a misfire classification is made, is "delayed" one or more events from the most recent event or firing observation. This "delay" permits accelerations that are observed and/or effected at steps immediately following a misfire to contribute to the decision-making process. In this manner, system 10 observes occurrences before and after an event in order to more accurately classify the event.

This learning process or procedure, which is described more fully and completely below, has been found to be relatively effective even without "pre-training" and in the total absence of label information. In one non-limiting embodiment, the present system 10 may be deployed within an engine and/or vehicle without pre-training system 10. In this non-limiting embodiment, an internal measure of performance is used as an indicator of whether particular misfire calls are expected to be reliable.

Figure 5:
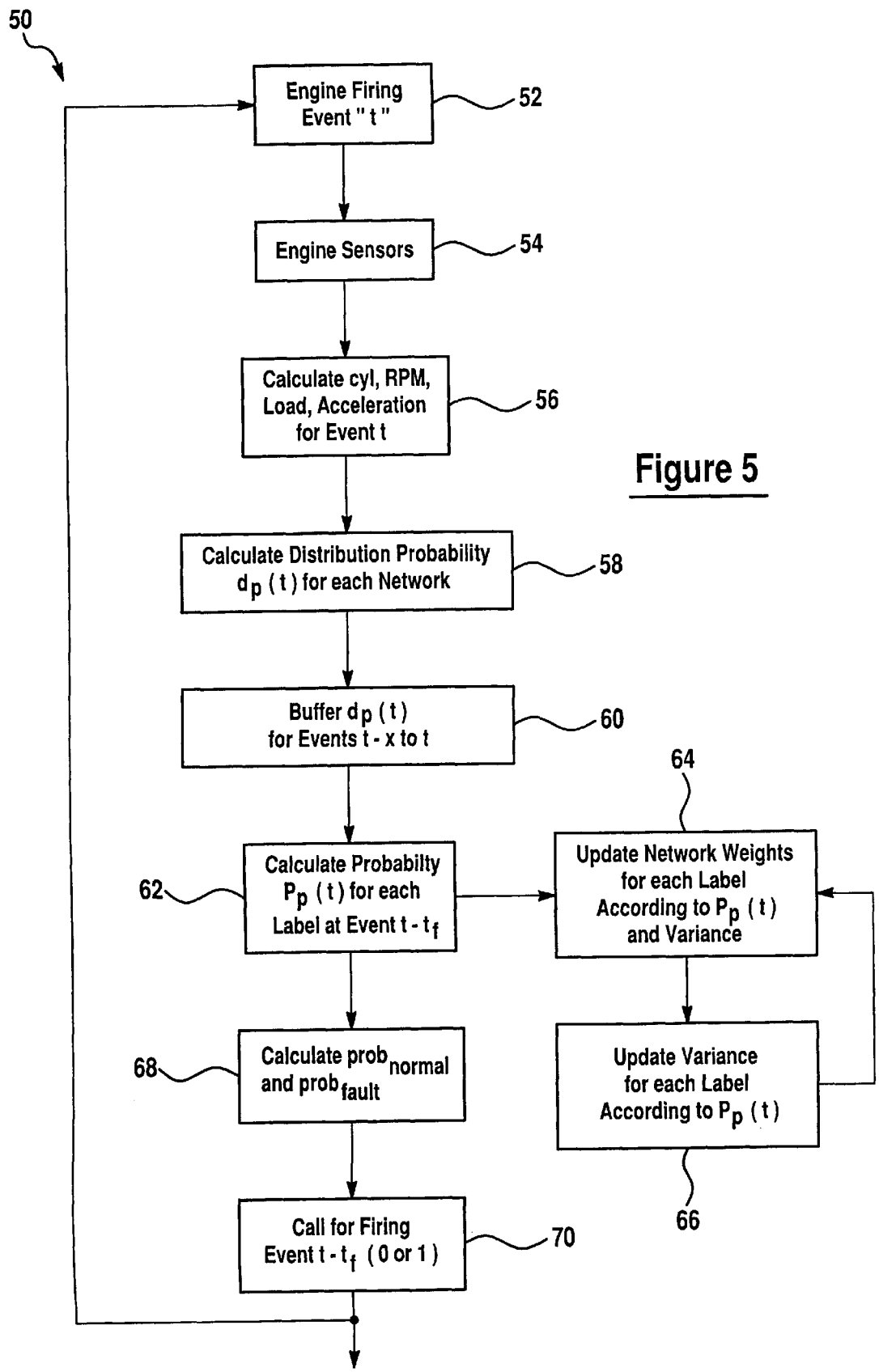
FIG. 5 is a block diagram illustrating the operational functionality of the system that is shown in FIG. 1.

To understand the operation of preferred embodiment of system 10, reference is now made to operational flow diagram or "flow chart" 50 of FIG. 5, which illustrates the operational functionality of system 10. As shown in functional block or step 52 of flow diagram 50, the classification or misfire determination process begins with a firing event within the engine. In functional block or step 54, the occurrence of the firing event "t" is detected, and the engine operating condition data which accompanies firing event "t" (e.g., data representing the engine speed and load) is measured by sensors 16 and is communicated to controller 12. In functional block or step 56, controller 12 uses the received data, in a known and conventional manner, to determine the cylinder that corresponds to firing event "t" (e.g., the cylinder in which the firing event "t" occurred). Controller further uses the received data, in a known and conventional manner, to calculate the engine speed, load and acceleration which accompany, and/or result from, firing event "t". The calculated cylinder identification, engine load, engine speed, and acceleration are stored within a table or matrix in memory 14.

In functional block or step 58, controller 12 calculates a "distribution" probability (i.e., $d_p$ (t)) for each labeled network (i.e., the probability that each labeled network is appropriate to describe the current engine misfire state). Particularly, controller 12 inputs the engine speed and engine load into each network within the group or set that corresponds to the identified cylinder for the current firing event "t". For instance, if cylinder 2 has fired, controller 12 inputs the calculated engine speed and engine load into each of the networks $N_{0,2}$, $N_{1,2}$, $N_{2,2}$, $N_{3,2}$, $N_{4,2}$, $N_{2,5}$, $N_{6,2}$, and $N_{7,2}$. The "expected" acceleration which is output by each of the networks is compared to the measured acceleration, and based on this comparison, the probability that each network is the "correct" network (i.e., that each network describes the current engine misfire state) is calculated. In one non-limiting embodiment, the "distribution" probability, $d_p$ (t) for each network "p" is calculated using the following equation:

$$d_p(t) = \frac{1}{\sqrt{2\pi\sigma_p^2}} \exp\left(-\frac{(y(t) - \hat{y}_p(t))^2}{2\sigma_p^2}\right) \quad \text{(Eq. 1)}$$

where $d_p$ (t) is the probability that a network p (e.g., network $N_{0,2}$) is the appropriate network to describe the current misfire state, $\sigma_p^2$ is the variance of the network p, y(t) is the current measured or "raw" acceleration at event "t", $\hat{y}_p$ (t) is the "expected" acceleration value which is output by network p.

The distribution probability for each labeled network is saved within a buffer, table or matrix within memory 14. The number of events which are held in the buffer (i.e., x=1+ $t_b+t_f$) is determined by the number of firing events before the current event which are considered for the misfire determination or the backward horizon ("$t_b$"), and the number of firing events after the current event which are considered for the misfire determination or the forward horizon ("$t_f$"), which are to be considered when performing the misfire calculation. The values of the backward and forward horizons are typically determined by the requirement for consistency of label sequences.

Particularly, the probability that an event labeled i is followed by an event labeled j is referred to as the transition probability ("$a_{ij}$"). The transition probabilities for all possible events within the forward and backward horizons form a transition probability matrix A that is saved within memory 14. The values stored within matrix A may be determined in a laboratory setting or by other known methods. It should be appreciated that some transitions are not allowable, and will therefore have a value $a_{ij}$=0. For example and without limitation, a label of 011 could not immediately follow a label of 000, 010, 011, 100, 110, or 111. By considering both "forward" ("$t_f$") and "backward" ("$t_b$") horizons and ensuring that the sequence of labels over the forward and backward horizons is consistent with A, system 10 significantly increases the accuracy of misfire determinations, and ensures that the neural networks are properly and efficiently trained.

Figures 6, 7:
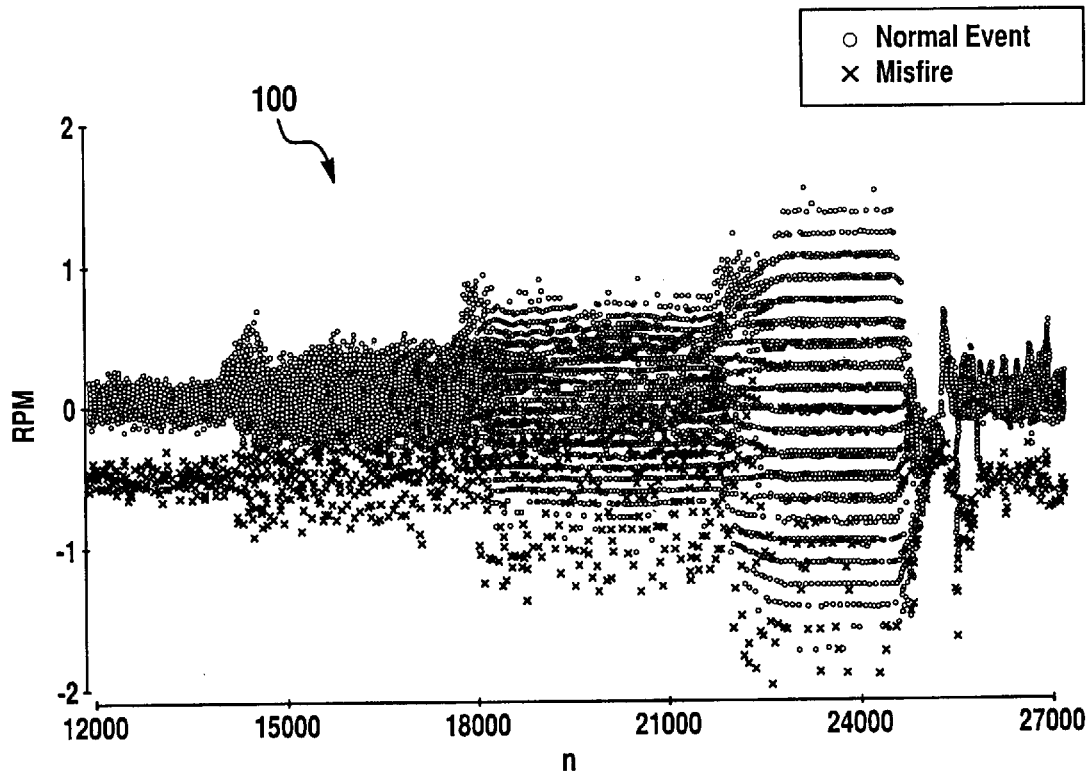
FIG. 6 is a an example of a buffer or table used within the system shown in FIG. 1.
FIG. 7 is a graph illustrating the acceleration values of various normal events and various misfire events occurring within an engine.
Figure 8:
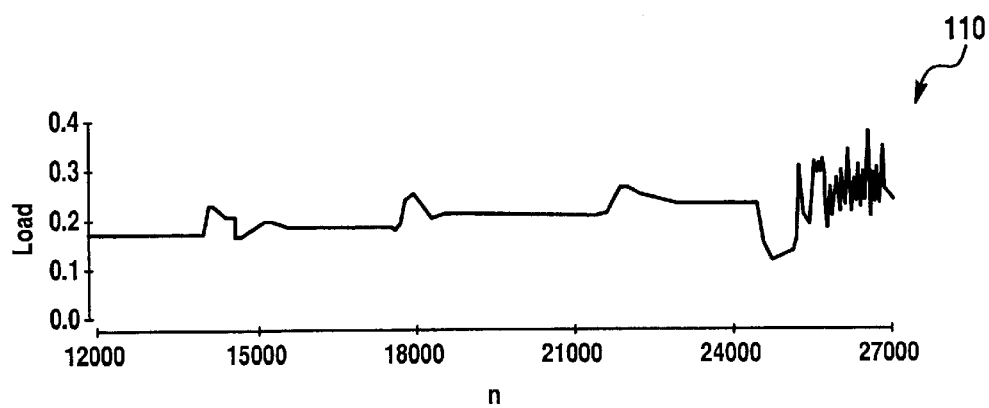
FIG. 8 is a graph illustrating engine load over a series of firing events occurring within an engine.
Figure 9:
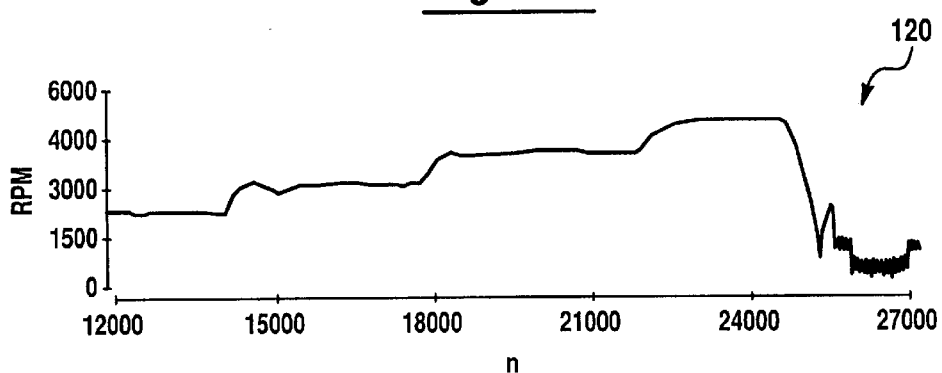
FIG. 9 is a graph illustrating engine speed over a series of firing events occurring within an engine.

One non-limiting example of a buffer 72 is illustrated in FIG. 6. In buffer 72, the forward and backward horizons are each equal to 2, and hence, events "t" through "t-4" are buffered. As shown, buffer 72 includes five columns 74–82 which respectively represent the current and last four firing events, and eight rows which represent the possible network "labels" associated with each event (e.g., the eight potential misfire states, 000 to 111, or 0 to 7). The values held within the table correspond the to the distribution probabilities for each of the potential labels or misfire states at each of the firing events (e.g., "t" through "t-4"). As described more fully and completely below, by considering both the "forward" horizon and the "backward" horizon, the present system 10 and the "forward-backward" procedure used by system 10 adequately takes into account the effects that misfires have on future firing events.

In functional block or step 62, controller 12 calculates the "normalized" probability (i.e., $p_p$ (t)) that each network at firing event "$t-t_f$" corresponds to the correct misfire state of the engine at event "$t-t_f$", considering the entire sequence of events from "t-x" to "t". In one non-limiting embodiment, the "normalized" probability for each network "p" is determined by the following equation:

$$P_p(k) = \frac{\alpha_p(k)\beta_p(k)}{\sum_{j=0}^{2^m-1} \alpha_j(k)\beta_j(k)} \quad \text{(Eq. 2)}$$

where $\alpha_p$ (k) is a probability measure related to observing the sequence y(t-x), y(t-x+1), ..., y(t-$t_f$) and network label p at event k=t-$t_f$, $\beta_p$ (k) is a probability measure related to observing the sequence y(k+1), y(k+2), ..., y(t) starting with a label p at event k, and $2^{m-1}$ is the equivalent decimal value or notation of the network label p (e.g., 0–7).

Each $\alpha_j$ (k) can be determined from the "forward" part of the procedure. First, $\alpha_j$ (t-x) is initialized as follows:

$$\alpha_j(t-x)=\pi_j d_j(t-x), j=0,1,2,\ldots,2^m 31\ 1 \quad \text{(Eq. 3)}$$

where $\pi_j$ is the prior probability of label. For all $\alpha_j$ at the next time step the following recursion is performed:

$$\alpha_j(n) = \left[\sum_i \alpha_i(n-1)a_{ij}\right]d_j(n), \quad \text{(Eq. 4)}$$

$$n = t-x+1, t-x+2, \ldots, k$$

where $a_{ij}$ is an element of the transition matrix A which represents the probability of transition from label i to label j. The system then normalizes $\alpha_j$ (k) by the total probability over all labels $\Sigma_i[\Sigma_i\alpha_i(k-1)\alpha_{il}]d_l(k)$.

Each $\beta_j$ (k) is determined from the "backward" part of the procedure. $\beta_j$ (t) is initialized as follows:

$$\beta_j(t)=1, j=0,1,2,\ldots,2^m-1 \quad \text{(Eq. 5)}$$

For all β at the previous time step the following recursion is performed:

$$\beta_j(n-1) = \sum_i \beta_i(n)d_i(n)a_{ji}, n = t, t-1, \ldots, t-t_f+1 \quad \text{(Eq. 6)}$$

$\beta_j$ (k) is also normalized by the total probability over all labels, $\Sigma_j \Sigma_i \beta_i(k+1)d_i(k+1)\alpha_j$.

In this adaptive setting, the recursion, which is illustrated in Equation 4, poses no practical problem. However, the system cannot make use of data arbitrarily far beyond the step k=t–t$_f$. In Equation 6, the choice of t$_f$ determines the latency associated with classifications available from the learning system, (i.e., how long system 10 must wait after a given step for a classification to be able). A larger t$_f$ also increases the storage required to carry out the calculation of $\beta_p$ (k).

Once the normalized probability is determined for each label (e.g., 000 through 111 or 0 through 7), the networks corresponding to each label (e.g., N$_{0,2}$–N$_{7,2}$) are "trained" or updated, in a conventional manner, based upon the normalized probabilities and variance of each network, as shown in functional block or step 64. For example and without limitation, networks with higher probability values receive more "training" than networks with lower normalized probability values. Additionally, the higher the current value of the variance is, the less "training" the networks receive.

The variance (i.e., $\sigma_p^2$) for each label p is calculated or updated in functional block or step 66, and is calculated by use of the following equation:

$$\sigma_p^2 = \frac{\sum_t (y(t) - \hat{y}_p(t))^2 P_p(t)}{\sum_t P_p(t)} \quad \text{(Eq. 7)}$$

As shown in block 68, the probability that the engine has misfired at event "t–t$_f$" and the probability that the engine has fired normally at "t–t$_f$" are calculated. The probability of a misfire event at "t–t$_f$" (i.e., prob$_{fault}$ (t–t$_f$)) is calculated by summing the calculated normalized probabilities for all of the "odd" numbered labels (i.e., labels 1, 3, 5, and 7 or 001, 011, 101 and 111), which represent labels "ending" in a misfire. Conversely, the probability of a normal firing event at "t–t$_f$" (i.e., prob$_{normal}$ (t–t$_f$) is equal to 1–prob$_{fault}$ (t–t$_f$).

In block 70, controller 12 determines, based on the values of size of prob$_{normal}$ (t–t$_f$) and prob$_{fault}$ (t–t$_f$), whether the event "t–t$_f$" was misfire event or a normal firing event. Particularly, if prob$_{normal}$ (t–t$_f$) is greater than prob$_{fault}$ (t–t$_f$), controller 12 determines that the event "t–t$_f$" was a normal firing event, otherwise, controller determines that the event "t–t$_f$" was a misfire. Controller 12 stores the result of this determination within a database or table within memory 14.

An internal measure of performance for the systems 10 may be pre-determined by comparing the measured acceleration value to the weighted average of the individual neural network outputs. The weighted average is determined by the following equation:

$$\hat{y}_{ave}(t) = \sum_p P_p(t)\hat{y}_p(t) \quad \text{(Eq. 8)}$$

Comparing $\hat{y}_{ave}(t)$ with the measured or "raw" acceleration values provides a qualitative indication of how well system 10 is modeling the actual behavior of the engine.

The advantages of the present modeling system 10 may be described with reference to FIGS. 7 through 13. For example and without limitation, FIG. 7 illustrates a graph 100 which plots crankshaft acceleration values for a series of firing events (i.e., events 12,000–27,000), which occur within all cylinders of an engine. The load and speed of the engine over events 12,000–27,000 are respectively illustrated in graph 110 of FIG. 8, and graph 120 of FIG. 9. As is evident by graph 100, it is relatively difficult to distinguish or separate normal events from misfire events for a significant portion of the firing events shown. However, when the normal and misfire events are displayed for only a single cylinder, the variation in acceleration is significantly decreased and it becomes easier to distinguish and/or separate normal firing events from misfire events.

Figure 10:
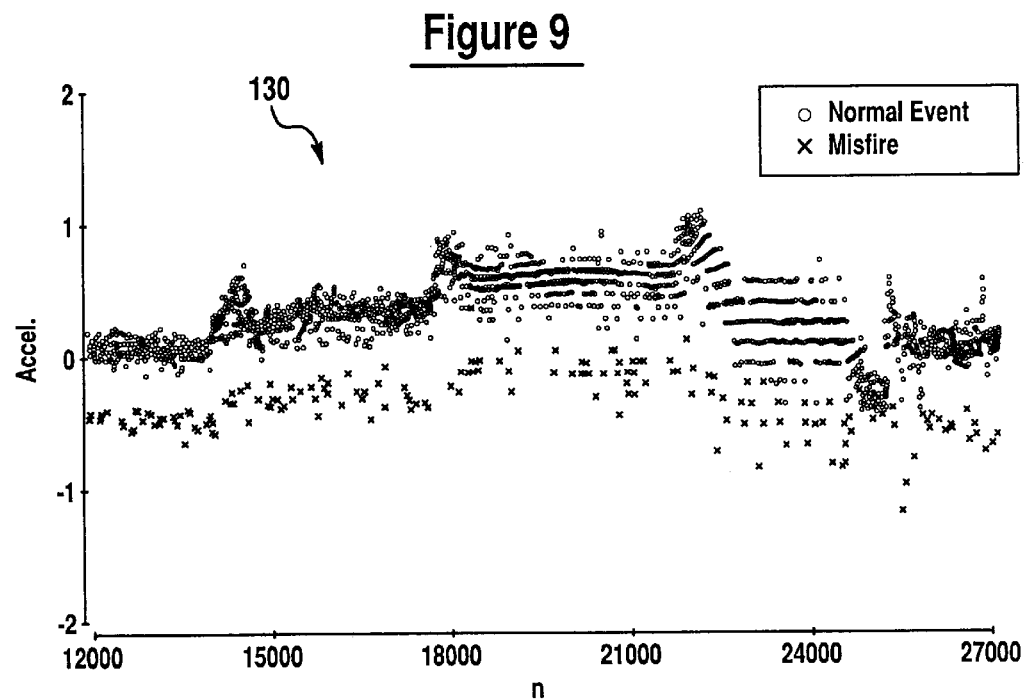
FIG. 10 is a graph illustrating the acceleration values of various normal events and various misfire events occurring within a third cylinder of an engine.
Figure 11:
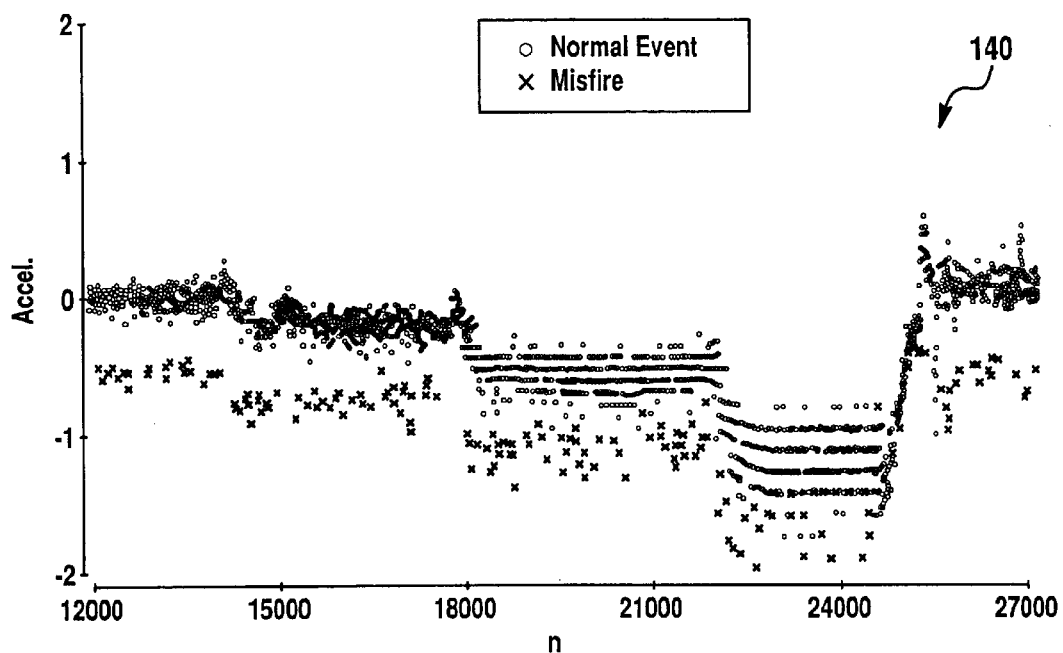
FIG. 11 is a graph illustrating the acceleration values of various normal events and various misfire events occurring within a fourth cylinder of an engine.
Figure 12:
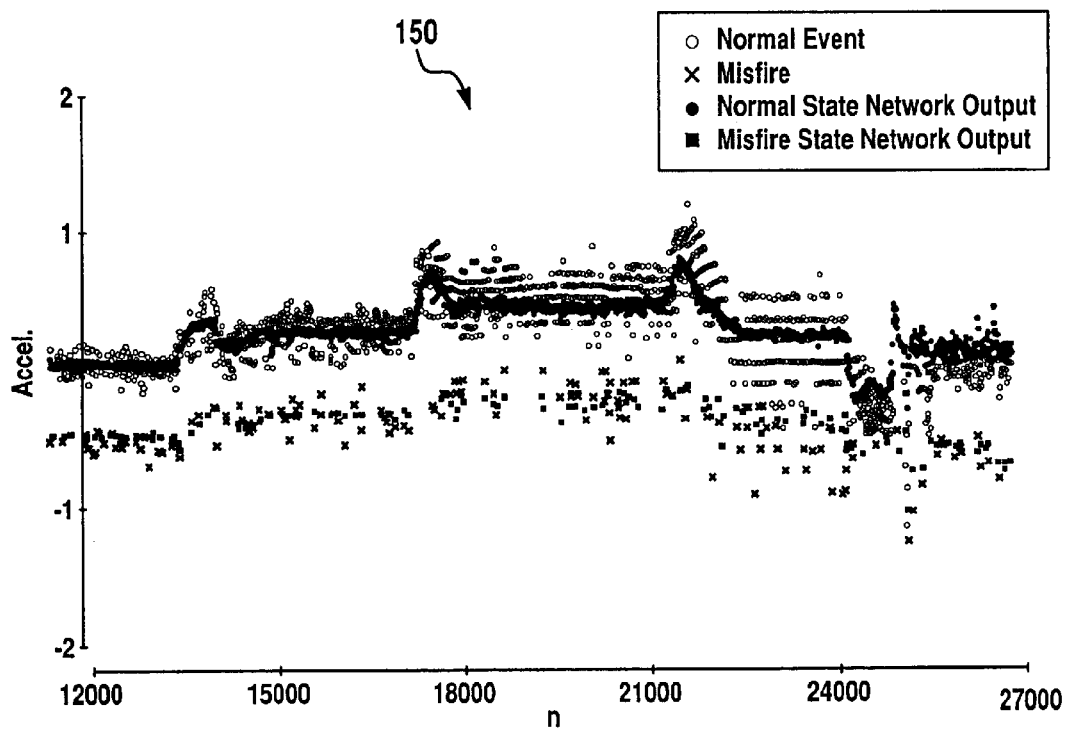
FIG. 12 is a graph illustrating the output of a neural network used within the present invention and plotted over the graph illustrated in FIG. 10.
Figure 13:
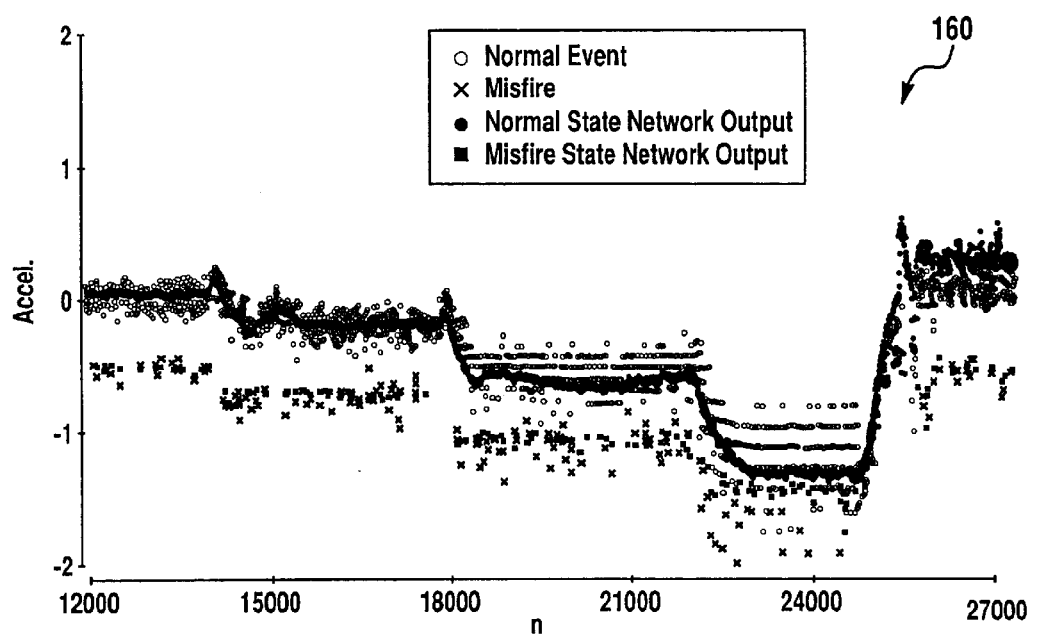
FIG. 13 is a graph illustrating the output of a neural network used within the present invention and plotted over the graph illustrated in FIG. 11.

For example and without limitation, graph 130 of FIG. 10 and graph 140 of FIG. 11 illustrate normal and misfire events respectfully occurring within cylinders three (3) and four (4) of an eight-cylinder engine. As demonstrated by graphs 130 and 140, the variances between normal events and misfire events over individual cylinders is much less than the variance between normal events and misfire events over all cylinders. Graph 150 of FIG. 12 and graph 160 of FIG. 13 illustrate the output of two networks trained by use of the above-described adaptive method. As demonstrated by graphs 150 and 160, the output of the trained networks provides a relatively accurate representation of "average" behavior when the current firing event is a normal event and of the "average" behavior when the current firing event is a misfire event.

It should be appreciated that by adaptively training and developing neural networks in the above-described manner, system 10 adaptively compensates for the changes within engine, such as changes caused by vehicle aging, and for the variability which exists from engine to engine. Additionally, the "forward-backward" procedure utilized by system 10 desirably takes into account the effect that misfires have on future firing events.

It is understood that the various inventions are not limited to the exact construction and method illustrated and described above, but that these previously delineated inventions may be varied without departing from the scope of the inventions as described in the following claims.

What is claimed is:

1. A system for determining whether a first firing event within an engine is a normal event or a misfire, said apparatus comprising:
   at least one sensor which measures first engine operating data which is associated with said first firing event, and second engine operating data which is associated with at least one second firing event which occurs before said first firing event; and
   a controller which is communicatively coupled to said at least one sensor and which receives said first and second engine operating data, said controller including a plurality of neural networks which are employed by said controller to determine whether said first firing event is a misfire or a normal event based upon said first engine operating data and said second engine operating data.

2. The system of claim 1 wherein said at least one second firing event comprises a plurality of firing events.

3. The system of claim 1 wherein said controller is further effective to adaptively train said plurality of neural networks based upon said determination.

4. The system of claim 1 wherein said at least one sensor further measures third engine operating data which is associated with at least one third firing event which occurs after said first firing event, and wherein said controller determines whether said firing event is a misfire or a normal event, based further upon said third engine operating data.

5. The system of claim 4 wherein said at least one third firing event comprises a plurality of firing events.

6. The system of claim 1 wherein said engine includes a plurality of cylinders, and wherein said plurality of neural networks are arranged within a plurality of sets, each of said plurality of sets corresponding to a unique one of said plurality of said cylinders.

7. The system of claim 6 wherein each of said plurality of sets comprises a plurality of neural networks which each correspond to a unique misfire state of said engine.

8. A method for determining whether an event occurring within an engine is a misfire event, said method comprising the steps of:

identifying a plurality of potential misfire states for said engine;

providing a plurality of neural networks, each of said neural networks corresponding to a unique one of said potential misfire states;

determining a first probability that each of said plurality of neural networks corresponds to a current misfire state of said engine;

determining a second probability that each of said plurality of neural networks corresponds to a misfire state of said engine which occurs before said event;

determining a third probability that each of said potential neural networks corresponds to a misfire state of said engine which occurs after said event; and adaptively training said plurality of neural networks based upon said first, said second, and said third probabilities.

9. The method of claim 8 wherein each of said plurality of neural networks is adapted to receive an engine speed value, an engine load value, and a processed acceleration value and is further adapted to output an expected acceleration value based upon said engine speed value, said engine load value and said processed acceleration value.

10. The method of claim 8 wherein each of said plurality of neural networks is pre-trained by use of labeled data.

11. The method of claim 8 further comprising the steps of:

determining whether said event is a misf ire event based upon said first, said second, and said third probabilities.

12. The method of claim 11 wherein said determination is made by use of a misfire state transition probability matrix.

13. A method for determining if a firing event within an engine is a misfire, said method comprising the steps of:

providing a plurality of neural networks which each correspond to a potential misfire state of said engine;

calculating a plurality of first values, each of said plurality of first values being equal to the probability that a unique one of said plurality of neural networks is appropriate to describe a current misfire state of said engine;

calculating a plurality of second values, each of said plurality of second values being equal to the probability that a unique one of said plurality of neural networks is appropriate to describe a sequence of misfire states of said engine occurring before said firing event;

calculating a plurality of third values, each of said plurality of third values being equal to the probability that a unique one of said plurality of neural networks is appropriate to describe a sequence of misfire states of said engine occurring after said firing event; and determining whether said firing event is a misfire based upon said plurality of first values, said plurality of second values and said plurality of third values.

14. The method of claim 13 wherein each of said plurality of neural networks comprises a static neural network.

15. The method of claim 14 further comprising the steps of:

acquiring values for a first, second, third and fourth engine operating condition and inputting said values for said first, second, and third engine operating condition into each of said plurality of neural networks, effective to cause each of said plurality of neural networks to generate an output value; and comparing each of said generated output values to said value of said fourth engine operating condition.

16. The method of claim 15 further comprising the step of:

adaptively training said plurality of neural networks based upon said values of said first, second, third, and fourth engine operating condition, and said generated output values.

17. The method of claim 16, wherein said first engine operating condition is engine load, wherein said second engine operating condition is engine speed, wherein said third engine operating condition is processed acceleration, and where said fourth engine operating condition is measured acceleration.

* * * * *